July 22, 1958  J. H. EDMAN  2,844,166
HYDRAULIC DETENT FOR VALVE
Original Filed Nov. 3, 1954

*INVENTOR.*
*J. H. EDMAN*

United States Patent Office 2,844,166
Patented July 22, 1958

2,844,166

HYDRAULIC DETENT FOR VALVE

John H. Edman, Waterloo, Iowa, assignor to Deere Manufacturing Co., Dubuque, Iowa, a corporation of Iowa Original application November 3, 1954, Serial No. 466,649. Divided and this application October 24, 1955, Serial No. 542,449

4 Claims. (Cl. 137—622.5)

This invention relates to a fluid-pressure-operated detent for a fluid control valve and more particularly to means for operating the detent by or in response to abnormal pressure in the circuit.

The application is a division of co-pending application Ser. No. 466,649, filed November 3, 1954.

In a fluid-pressure-operated control system for agricultural implements and other machines, it is customary to provide a valve shiftable selectively in opposite directions, for example, from a central neutral position and to provide some form of means, customarily in the form of a detent, for retaining the valve in one or the other of its active positions. It is also known to make provision for automatic return of the valve to its neutral position when the pressure in the system rises above a predetermined value. One such example is disclosed in assignee's U. S. patent to Jirsa et al. 2,532,552. That design is typical of those using mechanical means for returning the valve to neutral. According to the present invention, the detent is released by at least a portion of the excess fluid pressure. It is a feature of the present invention to provide first and second relief valves in series, the second valve having a setting lower than that of the first valve, together with means including a detent-controlling passage connected to the relief conduit intermediate the relief valves and leading to a chamber for supplying fluid under pressure to a piston associated with the detent. The invention features also means for locking out the detent when desired.

The foregoing and other important objects and desirable features inherent in and encompassed by the invention will become apparent as a preferred embodiment of the invention is disclosed, by way of example, in the following specification and accompanying sheet of drawings, the several figures of which are described immediately below.

Figure 1:
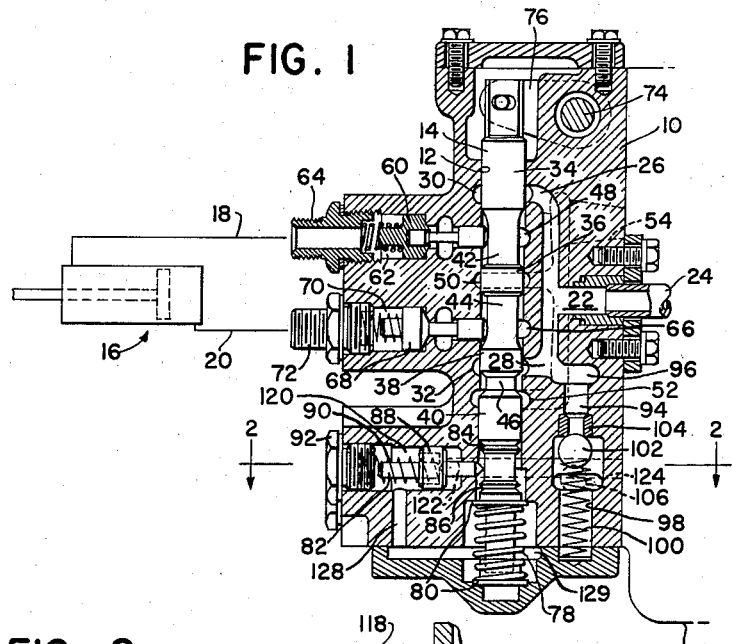
Fig. 1 is a secitonal view through a representative valve housing.

In the embodiment of the invention selected for purposes of the present disclosure, a main control valve housing 10 has a vertical valve bore 12 in which is mounted an axially shiftable valve member 14 for selectively supplying fluid to one or the other of the opposite ends of a fluid motor 16 of the cylinder and piston type, opposite ends of this motor being connected to the valve housing 10 by fluid lines 18 and 20, the motor and fluid lines 18 and 20 being illustrated schematically in connection with the sectional remainder of the view.

The valve housing 10 has a high pressure passage 22 to which fluid under pressure is supplied via a conduit 24 and any suitable pump (not shown). The conduit 22 branches at 26 and 28 to communicate respectively with upper and lower annular grooves 30 and 32, concentric with the valve member bore 12. The valve member 14 has a plurality of coaxially spaced apart lands or spools 34, 36, 38 and 40, separated respectively by intervening reduced portions 42, 44 and 46. These are instrumental in controlling the circulation of fluid from the high pressure inlet 22 selectively among the following grooves coaxially spaced apart along and concentric with the valve bore 12: an upper motor groove 48, an upper return groove 50, and a lower return groove 52, the return grooves 50 and 52 leading to a common return line 54. This line may lead to any suitable reservoir (not shown) as contained within a casing 56, to the rear wall 58 of which the valve housing 10 is connected.

The motor groove 48 leads via an upper check valve 60 to an upper motor outlet which is in turn connected by a coupling 64 to the motor line 18. The lower motor groove 66 leads via a lower check valve 68 to a lower motor outlet 70 which is in turn connected by a coupling or connector 72 to the other motor line 20. When the valve member 14 is in its neutral position as shown in Fig. 1, both check valves 60 and 68 are closed. The lower branch 28 of the high pressure line 22 is connected via 32—46—52 to the reservoir or return line 54. Hence, fluid circulates through the valve structure at only slight pressure. When the valve member 14 is shifted upwardly, which may be accomplished by any suitable control such as a housing-mounted rockshaft 74 and associated lever 76, the upper spool 34 on the valve member 17 exposes the upper high pressure branch 26 to the upper motor groove 48 via the reduced portion 42 on the valve. At the same time, a ramp at the junction between the reduced valve portion 44 and its next adjacent spool 38 positively opens the lower check valve 68. The valve spool 40 cuts off the communication between the grooves 32 and 52, which leaves the high pressure line 22—26 connected solely to the upper motor groove 48 and fluid under pressure flows thence through the pressure-opened check valve 60 and line 18 to the piston-rod end of the motor 16. Fluid returning from the opposite end of the motor flows through the line 20, the coupling 72, the motor outlet 70, past the positively opened check valve 68 and into the valve bore 12 between the valve spools 36 and 38. Since the valve member 14 is now displaced upwardly, the upper reservoir groove 50 is exposed to the valve bore and the returning fluid can flow to the common return line 54. The other active position of the valve member is achieved when the valve member is moved downwardly, in which case the motor line 20 becomes the high pressure line and the motor line 18 becomes the low pressure line, all of which is deemed to be clear from the foregoing and accordingly further description is omitted.

The lower end of the valve member 14 is connected to centering means, here including a coiled compression spring 78 interposed between a pair of washers 80 and so arranged that regardless of the direction of axial movement of the valve member 14, it will always be returned to its neutral position as shown in Fig. 1. However, since it is desired to lock the valve member in one or the other of its active positions, thus relieving the operator of the necessity of holding the valve, it is conventional to provide some form of detent means. In the present case, the detent means takes the form of a plunger 82 having its pointed end selectively engageable with either an upper groove 84 or a lower groove 86 formed in the valve member 14 intermediate the centering spring washer 80 and the spool 40. The plunger 82 has an intermediate piston portion 88 and the plunger is spring-loaded by a coiled compression spring 90, backed up by threaded plug 92, so as to be constantly urged or biased toward engagement with the valve member 14. In the neutral position of the valve member, the pointed end of the plunger 82 lies midway between the upper and lower detent grooves 84 and 86. When the valve member is moved downwardly to one of its active positions, the groove 84 overrides the detent momentarily and the plunger seats in the groove 84. The detent is releasable by manual force applied to the valve member 14 to move it upwardly. The same relationship exists when the valve member 14 is moved upwardly, except that the plunger 82 engages the lower groove 86.

The principal feature of the present invention is the provision of means for automatically releasing the detent action so that the operator need not devote his attention to that task. In other words, the detent is released automatically in response to an abnormal increase in pressure in the circuit.

It will be understood from the foregoing that there is a limited amount of axial movement of the valve member 14 in opposite directions without engaging the detent. That is to say, the distance between the grooves 84 and 86, which constitute detent-receiving portions, permits this axial movement and affords what may be termed slow-speed operation of the system. Of course, as long as neither of the detent grooves is engaged, the centering spring 78 will always return the valve member 14 to its neutral or central position as soon as the operator relieves the application of force on the valve member control rockshaft 74.

Figure 2:
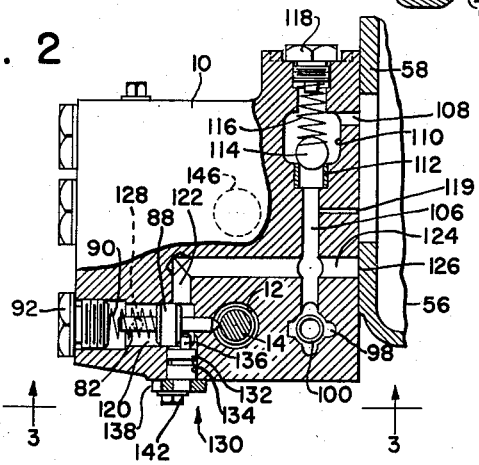
Fig. 2 is a fragmentary sectional view as seen through the housing of Fig. 1 as cut by a plane including the line 2—2.

The lower portion of the valve housing 10 includes a relief conduit or passage 94 which has its inlet end connected to an offset portion 96 of the high pressure passage 22—28. The passage 94 extends vertically as part of or as including a lower counterbore 98, in which counterbore is provided a relief valve spring 100 which acts against a relief valve in the form of a ball 102 that seats against a seat insert 104 near the top of the passage. The vertical passage 94—104—98 is intersected by a transverse passage or conduit 106 (Fig. 2) which terminates at 108 in a return or reservoir outlet. The junction between the conduit 106 and the outlet 108 is in the form of a chamber 110 having a relief valve seat 112 with which is cooperative a second relief valve ball 114. This ball is backed up by a coiled compression spring 116 which in turn is located by a threaded plug 118. A bleed 119 leads off from the passage 106 upstream of the second relief valve ball 114, to prevent the entrapment of fluid under pressure in the relief conduit.

The detent plunger piston 88 is contained and reciprocable in a plunger cylinder or chamber 120, which is connected by angularly related passage portions 122 and 124 with the relief valve passage 106, the connection being made intermediate the relief valve balls 102 and 114. The end of the passage 124 is blinded at 126 against the rear wall portion 58 of the main case 56.

From the description thus far, it will be seen that an increase in pressure, above a predetermined value, in the circuit, will unseat the first relief valve ball 102, and a portion of this fluid will, via the passage portions 124 and 122, enter the detent plunger chamber 120 ahead or to the right of the plunger piston 88. Only a portion of the excess fluid is used, since the setting of the second relief valve 114 is lower than that of the first relief valve 102. In other words, the spring 100 is stronger than the spring 116. Nevertheless, the fluid entering ahead of the detent piston 88 causes the piston 88 to move rearwardly against the bias of its spring 90, thereby withdrawing the pointed end of the detent plunger 82 from whichever one of the detent grooves it is associated with, whereupon the centering spring 78 automatically returns the valve member 14 to neutral. A bleed 128 leads off from the chamber 120 behind the piston 88 and is directed to the centering spring chamber at 129, which chamber is connected to the reservoir in any suitable manner (not shown). The purpose of the bleed 128 is to prevent entrapment of fluid between the threaded plug 92 and the back of the detent plunger piston 88.

In a preferred form of the invention, the relief valves may be considered set, by way of example, in such manner that the first relief valve 102 will open at eleven hundred p. s. i. The second relief valve 114 may be set to open at a pressure of one hundred p. s. i. The use of only a portion of the excess pressure to actuate the detent piston 88 is preferable to subjecting the piston to the full pressure. This means that the pressure on the detent means will always be uniform, consistent with the bias in the spring 116, the advantages of which will be obvious without elaboration.

Figure 3:
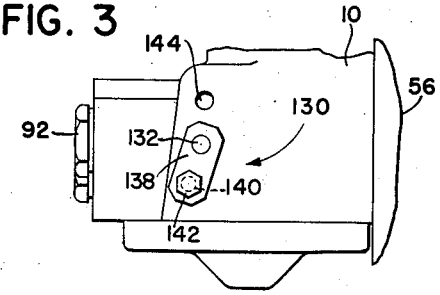
Fig. 3 is a fragmentary elevation as viewed in the direction of the arrows 3—3 in Fig. 2.

It is a significant feature of the present invention to provide means for selectively nullifying the effects of the detent means or piston and plunger 82—88. That portion of the valve housing 10 that forms the detent chamber 120 serves as support means for a lock element designated generally by the numeral 130. This element comprises a bi-positionable rockshaft 132 carried in a bore 134 that intersects the front portion of the detent chamber 120. The inner end of the lock rockshaft 132 has means thereon in the form of an eccentric 136 which engages the front face of the detent piston 88, that face of the piston serving as a lock-receiving part for cooperation with the eccentric. The external end of the rockshaft 132 has secured thereto means for selectively fixing the rockshaft in either one of two positions angularly related about the rockshaft axis. This means comprises an arm 138 having one end apertured at 140 to receive securing means, here in the form of a cap screw 142. The external side of the valve housing has a pair of spaced tapped bores, one of which coincides with the position of the cap screw 142 in Fig. 3 and the other of which is shown at 144 in Fig. 3. When the arm 138 is in the position of Fig. 3, the cap screw 142 is passed through the arm aperture 140 and into the first mentioned aperture in the valve housing 10. The rockshaft is thus angularly positioned in such manner that its eccentric 136 is in a forward position, which affords maximum forward travel to the detent piston 88, and the detent means will function as described above for the purpose of locking and releasing the valve member 14 under control of pressure rise in the system. However, when the cap screw 142 is removed and the arm is rotated to a position in which the arm aperture 140 is in register with the valve housing tapped bore 144, the cap screw 142 can be passed through the arm aperture and threaded into the upper bore, the eccentric 136 then moving rearwardly as the rockshaft is rocked and consequently withdrawing the pointed end of the detent plunger 82 from possible engagement with either of the valve member grooves 84 or 86. Therefore, regardless of the extent of axial movement of the valve member, there is no detent means for locking the same in any of its active positions, with the result that it will always be returned to neutral by action of the centering spring 78 as soon as the operator relieves the application of manual force thereon.

In that form of the invention illustrated, the valve housing 10 is shown as one including a companion valve similar to the valve 14. The position of this valve may be noted by the dotted circle 146 in Fig. 2. A detent means similar to that described may or may not be used with the second valve, all of which is without significance here, reference being made to the duplication of structure because of the disclosure thereof in the co-pending application of which the present application is a division.

The operation of the various components of the system has been described in connection with the description of the structure. The overall operational characteristics of the inventive design disclosed here can be gathered from the functions ascribed thereto and accordingly need not be elaborated. Features of the invention not categorically described will undoubtedly occur to those versed in the art, as will many modifications and alterations in the

What is claimed is:

1. In a fluid-pressure-operated control system: a valve housing having inlet, motor and exhaust passages and a control valve movable from a neutral position to an active position and biased for return to said neutral position for controlling said passages, said valve member having a detent-receiving portion; means including a detent chamber having an opening leading to the detent-receiving portion of the valve member when the valve member is in its active position; detent means including a piston in the detent chamber having a detent element projecting through the opening for extension into engagement and retraction out of engagement with the detent-receiving portion of the valve member; yielding means urging the piston in one direction to extend the detent element for releasably locking the valve member in its active position; a relief conduit having inlet and exhaust ends connected respectively to the inlet and exhaust passages and including a first relief valve biased at a certain setting to close the relief conduit against inlet passage fluid pressure and yieldable to excess fluid pressure to open and enable fluid flow through the relief conduit to the exhaust end of said conduit; a second relief valve in the relief conduit downstream of the first relief valve and normally biased to conduit-closing position against relief conduit fluid pressure and at a setting lower than that of the first relief valve; and means including a detent passage connected to the relief conduit intermediate the relief valves and leading to the detent chamber at the side of the piston in opposition to the detent biasing means for supplying relief conduit fluid to the detent chamber at a pressure in accord with the setting of the second relief valve to retract the detent element from engagement with the detent-receiving portion of the control valve member so that said valve member returns to neutral.

2. The invention defined in claim 1, including: support means comprising part of the detent chamber means; and a lock element carried by the support element for selective movement between a first position of engagement with the detent means to retract the detent element for nullifying said detent means and a second position of disengagement from the detent means to enable normal functioning of the detent means.

3. In a fluid-pressure-operated control system: a valve housing having inlet, motor and exhaust passages and a control valve movable from a neutral position to an active position and biased for return to said neutral position for controlling said passages, said valve member having a detent-receiving portion; a detent support adjacent to the valve member and carrying a detent element for extension and retraction respectively into and out of engagement with the detent-receiving portion of the actively positioned valve member, said detent element having a lock-receiving part thereon; yielding means biasing the detent element for extension thereof; and lock means for selectively nullifying the normal detent function of the detent element, including a bi-positionable rockshaft on the support having an inner portion interiorly of the detent support selectively engageable with the lock-receiving part of the detent element in one position of said rockshaft to forcibly retract the detent element against engagement with the valve member portion and in the other position to free said element for engagement with the valve member portion and further having an outer portion exteriorly of said support; and means for selectively fixing the rockshaft in either position including an arm secured to and extending radially from the outer portion of the rockshaft for rocking the rockshaft between its two positions, and releasable fastener means cooperative between the arm and the detent support for securing the arm to the support in either position of the rockshaft.

4. The invention defined in claim 3, in which: the free end of the arm is apertured, the support has a pair of openings spaced angularly apart according to the two positions of the rockshaft, said openings and aperture being equidistant from the rockshaft axis, and said fastener means is received in the arm aperture and selectively receivable in either support opening.

References Cited in the file of this patent

UNITED STATES PATENTS

| 2,276,979 | Jacobi | Mar. 17, 1942 |
| 2,545,573 | Fletcher | Mar. 20, 1951 |
| 2,617,626 | Calkins | Nov. 11, 1952 |
| 2,620,777 | Towler | Dec. 9, 1952 |
| 2,665,714 | Greenwood | Jan. 12, 1954 |
| 2,689,585 | Presnell | Sept. 21, 1954 |